US012367058B2

(12) United States Patent
Tsirkin et al.

(10) Patent No.: US 12,367,058 B2
(45) Date of Patent: Jul. 22, 2025

(54) EFFICIENT DISK CACHE MANAGEMENT FOR VIRTUAL MACHINES (71) Applicant: Red Hat, Inc., Raleigh, NC (US)

(72) Inventors: Michael Tsirkin, Raleigh, NC (US); Andrea Arcangeli, Raleigh, NC (US); Giuseppe Scrivano, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 468 days.

(21) Appl. No.: 17/835,466

(22) Filed: Jun. 8, 2022

(65) Prior Publication Data

US 2023/0401078 A1 Dec. 14, 2023

(51) Int. Cl.
*G06F 9/44* (2018.01)
*G06F 3/06* (2006.01)
*G06F 9/455* (2018.01)

(52) U.S. Cl.
CPC ........ *G06F 9/45558* (2013.01); *G06F 3/0604* (2013.01); *G06F 3/0659* (2013.01); *G06F 3/0664* (2013.01); *G06F 3/0673* (2013.01); *G06F 9/45545* (2013.01); *G06F 2009/45579* (2013.01); *G06F 2009/45583* (2013.01); *G06F 2009/45591* (2013.01)

(58) Field of Classification Search
CPC .................................................. G06F 9/45558
USPC ........................................................... 718/1
See application file for complete search history.

(56) References Cited

U.S. PATENT DOCUMENTS

| 9,286,087 | B2 | 3/2016 | Sharp et al. |
| 9,519,581 | B2 | 12/2016 | Banta et al. |
| 9,697,130 | B2 | 6/2017 | Karippara et al. |
| 10,042,760 | B2 | 8/2018 | Chang et al. |
| 2014/0068197 | A1* | 3/2014 | Joshi .................. G06F 12/0866 711/135 |

OTHER PUBLICATIONS

COWCache: Effective Flash Caching for Copy-On-Write Virtual Disks, © 2022 Springer Nature Switzerland AG. Part of Springer Nature., https://link.springer.com/article/10.1007/s10586-019-02948-8 (17 pages).
MultiCache: Multilayered Cache Implementation for I/O Virtualization, © 2016 Jaechun No and Sung-soon Park., https://www.hindawi.com/journals/sp/2016/3780163/ (14 pages).
(Continued)

*Primary Examiner* — Timothy A Mudrick
(74) *Attorney, Agent, or Firm* — Kilpatrick Townsend & Stockton LLP (57) ABSTRACT An example system includes a memory, a processor in communication with the memory, and a hypervisor. The hypervisor is configured to store, as dirty memory, data from a virtual machine (VM) at least until the data is written back into a data storage. The hypervisor is also configured to assign a persistence setting for managing write back of the dirty memory of the VM into the data storage. The hypervisor is also configured to periodically trigger writing at least a portion of the dirty memory of the VM into the data storage based on the persistence setting being a first setting. The hypervisor is also configured to disable periodic triggering, by the hypervisor, of the writing of the dirty memory of the VM into the data storage based on the persistence setting being a second setting.

20 Claims, 6 Drawing Sheets (56) References Cited

OTHER PUBLICATIONS

Optimizing Virtual Machine I/O Performance in Cloud Environments, 2016, https://scholarscompass.vcu.edu/cgi/viewcontent.cgi?article-5715&context=etd (125 pages).

* cited by examiner

| Page Entry 202A | 210A PFN | 220A Clean, Unused | 230A Address of Unallocated Memory |
| --- | --- | --- | --- |
| Page Entry 202B | 210B PFN | 220B Clean, Used | 230B Address of Memory Allocated to VM 'A' |
| Page Entry 202C | 210C PFN | 220C Dirty, Used | 230C Address of Memory Allocated to VM 'A' |
| Page Entry 202D | 210D PFN | 220D Clean, Unused | 230D Address of Memory Allocated to VM 'A' |
| Page Entry 202E | 210E PFN | 220E Dirty, Used | 230E Address of Memory Allocated to VM 'B' |

EFFICIENT DISK CACHE MANAGEMENT FOR VIRTUAL MACHINES

BACKGROUND

Traditionally, a kernel manages memory resources of a computer system to reduce latency and optimize throughput associated with data read and write operations. For example, when an application running on the computer system attempts to write data to a data store (e.g., disk), the kernel may temporarily store the data in a cache or other local non-persistent memory (e.g., random access memory (RAM)) as dirty memory. By doing so, the kernel may reduce (or postpone) overhead (e.g., number of input/output operations per second (TOPS)) associated with writing the data to the data store and/or reading the data from the data store again in the future. However, to reduce the risk of data loss in the event of a crash or other system failure, the kernel may periodically trigger disk write processor operations (e.g., by programming timers to wake up dirty memory flusher software threads, etc.) so as to synchronize or flush the dirty memory into the data store periodically.

SUMMARY

The present disclosure provides new and innovative systems and methods for efficient disk cache management for virtual machines. In an example, a system includes a memory, a processor in communication with the memory, and a hypervisor. The hypervisor is configured to store, in the memory, data written by a virtual machine (VM) as dirty memory at least until the data is written back into a data storage. The hypervisor is also configured to assign a persistence setting for the VM or the data storage. The hypervisor is also configured to periodically trigger write back of at least a portion of the dirty memory into the data storage based on the persistence setting being a first setting. The hypervisor is also configured to exclude the dirty memory of the VM from periodically triggered write back operations of the hypervisor.

In an example, a method involves storing, as dirty memory, data from a virtual machine (VM) executing on a hypervisor at least until the data is written out to a data storage. The method also involves selecting a persistence setting for managing write out of the dirty memory of the VM into the data storage. The method also involves periodically triggering write out of at least a portion of the dirty memory to the data storage based on the persistence setting being a first setting. The method also involves disabling periodic triggering, by the hypervisor, of the write out of the dirty memory into the data storage based on the persistence setting being a second setting.

In an example, a non-transitory machine readable medium stores instructions that, when executed by at least one processor of a computer system, cause the computer system to storing, as dirty memory, data from a virtual machine (VM) at least until the data is written to a data storage. The instructions also cause the computer system to select a persistence setting for managing the dirty memory of the VM. The instructions also cause the computer system to periodically trigger writing at least a portion of the dirty memory to the data storage based on the persistence setting being a first setting. The instructions also cause the computer system to prevent periodic triggering, by a hypervisor, of the writing of the dirty memory into the data storage based on the persistence setting being the second setting.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Operating system (OS) kernels generally prefer to save data, as dirty memory, in non-persistent memory (e.g., RAM) because accessing non-persistent memory is usually much faster than accessing persistent memory (e.g., disk or other data storage). To mitigate the risk of data loss (e.g., in the event of a system crash) and/or to free up memory space, the kernel may flush or synchronize the dirty memory into the persistent memory periodically or in response to a triggering event. For example, the kernel (e.g., a supervisor or a hypervisor) may program software timers that periodically wake up disk cache flusher software threads to begin flushing at least a portion of the dirty memory (e.g., dirty memory that has not been flushed for a threshold amount of time, etc.).

In virtualized computing environments, enforcing such system-wide periodic timer-triggered periodic cleanup operations may result in additional latencies and computing overhead. For example, some processor configurations may need to suspend execution of the virtual machine (VM), transition from a VM mode (e.g., VM exit) to a host mode, start the disk I/O operations, then exit the host mode and return to the VM mode to resume execution of the virtual machine. Thus, periodically triggered hypervisor operations may involve an additional overhead to clean up dirty memory of a virtual machine. Further, the virtual machine itself may have a guest operating system (OS) that also periodically triggers dirty memory flushing operations similarly to the host OS, which further increases the overhead associated with implementing periodic dirty memory clean up processes. Moreover, in some configurations, multiple virtual machines may be executing on a single host machine, and each virtual machine may have its own kernel that performs periodic memory management functions associated with its guest space.

High write-back overhead (e.g., high number of TOPS) associated with such frequent dirty memory flush events could add latency to other processes (e.g., processor threads of an application in the virtual machine delayed each time the processor executes periodically triggered cleanup thread) running on the host system (e.g., sharing the same processor capacity and/or I/O capacity used to flush the dirty memory, etc.) and virtual machines executing as guests in the host system.

Furthermore, in virtual environments, the demand on persistent memory resources such as server data storage and other storage resources (e.g., virtual memory or swap memory on a disk, etc.) can rise sharply due to recurring events that have high I/O demand, such as boot, login, logoff, shutdown, application patches, etc., which are commonly referred to as I/O storms. Additionally, random workloads can spike throughout the day with no reliable way of knowing where they will occur, or what set of resources they will require. Periods with I/O intensive tasks such as boot storms, patching, and antivirus place even more demand on the underlying infrastructure, which may result in reducing system performance. To that end, frequent dirty memory flush events may also contribute to causing such I/O storms to repeatedly fetch data from storage on access.

To reduce latency associated with periodic disk cache write back operations, some kernels allow a user to adjust the periodic triggering interval used by the host OS. However, increasing the periodic cleanup interval at a high system-level and for all the virtual machines executing thereon can also result in higher risks such as data loss (e.g., if the host system crashes before the dirty memory of any of the VMs is flushed), out-of-memory faults (e.g., if the host system runs out of non-persistent memory), and/or data inconsistency (e.g., if an older version of the data stored in the persistent storage is accessed by another process or workload before a newer version of the data in the dirty memory of the workload is synchronized with the older version of the data in the persistent memory).

Additionally, some virtual machines may be more sensitive to such risks than others. For instance, some VMs may be persistent in nature while other VMs may be non-persistent in nature. By way of example, a first VM that is of a persistent type may be configured to process data (e.g., perform calculations for a simulation, collect sensor measurements, interact with user, etc.) or perform any other type of activity that is relatively more sensitive to data loss and/or data consistency risks. For instance, in the event of a system crash or other fault, it might be difficult to simply resume execution by restarting the first VM because of the lost data that was in the dirty memory. Alternatively or additionally, a user might prefer to prioritize minimizing data loss or data consistency risks when running the first VM to avoid repeating the same computations in the event of a failure or system crash.

On the other hand, a second example VM that is of a non-persistent type may be configured to perform functions that are less persistent in nature (e.g., initialize an application, build an application from source code, install software or application patch, run a setup script, perform an antivirus scan, etc.) or that are less sensitive to data loss and/or data consistency risks in the event of a crash. For instance, the second VM may be configured to terminate after performing some type of non-persistent or transient operation. Alternatively or additionally, in the event of a failure, a user might prefer discarding corrupt data generated by the incomplete execution of the second VM over attempting to fix the corrupt data (e.g., files installed during an incomplete installation of an application, etc.).

Accordingly, example systems and methods are disclosed herein that enable selectively cancelling periodically triggered dirty memory clean up operations for certain types of VMs that are less likely to benefit from the regular periodically triggered write back operations. By way of example, a hypervisor may expose a special type of storage device (e.g., virtual disk drive, etc.) to the guest virtual machine that is not guaranteed persistence if a crash occurs. Further, the hypervisor may decide to cancel periodically triggered write back operations of the dirty memory of the VM to that type of storage device. In doing so, the host OS may still trigger cleanup operations associated with other parameters such as minimum available memory capacity, etc., while skipping the implementation of periodically triggered clean up events for that particular VM. The host OS may also notify a guest OS of the virtual machine that the storage device is not persistent. In turn, the guest OS may also cancel periodic triggering of dirty memory clean up operations by the guest OS in response to receiving the notification from the host OS. In this way, overhead associated with periodic dirty memory write back operations can be avoided or reduced for the types of VMs that may not need to guarantee persistence in the event of a crash; while allowing other VMs that may benefit from periodically triggered write backs to continue using such feature.

As an example, if a virtual machine is created using the command "virsh create . . . ," the optimization described above of cancelling periodic write back operations for the dirty memory of the VM may not be applied, as such VM may be expected to survive a crash event and then restarted to resume execution from the last state at which the VM was running before the crash occurred (i.e., due to the frequent synchronization of its dirty memory).

In another example, if a virtual machine was created using the command "virsh create-destroy-on-crash . . . ", then the optimization of cancelling periodic dirty memory write backs may be activated as such virtual machine is configured to be removed or destroyed after a crash event or other termination event (i.e., without saving its current state to resume execution by restarting the VM).

In some examples, a system herein may be configured to identify one or more VMs suitable for this optimization (suspending periodic dirty memory cleanup operations) based on a configuration of the VM, a configuration of a workload (e.g., application) currently running in the VM (e.g., a setup or build script configured to remove its domain upon termination, etc.).

The example system or method may then monitor dirty memory usage of each workload. If dirty memory usage by a workload reaches a threshold ratio (e.g., 10%) and that workload is of the first type (persistent), a supervisor or hypervisor of the system may responsively trigger writing back (at least part of) the dirty memory of the workload into the data storage. But if the type of the workload is the second type (e.g., non-persistent), then the supervisor or hypervisor of the system may instead continue to delay writing back the dirty memory even though the threshold ratio (e.g., 10%) was triggered. For example, a computing system herein may be configured to allow a user or administrator to create or deploy a workload in a special type of pod or container (e.g., non-persistent container, build container, initialization container, etc.), which may not guarantee a same level of data consistency as other types of containers). Thus, when a given VM is executing that particular workload, the host OS and/or the guest OS may stop periodic triggering of cleanup operations at least until that workload terminates and is removed.

More generally, various example systems and methods herein may advantageously enable a user or workload administrator or kernel to flexibly control whether a kernel or hypervisor should prioritize data loss/data consistency risk mitigation by frequently flushing dirty memory of a first VM, and whether the kernel or hypervisor should instead prioritize minimizing write-back overhead by disabling periodically triggered flushing of the dirty memory of a second VM (e.g., if the second VM does not necessarily need guaranteed persistence).

Figure 1:
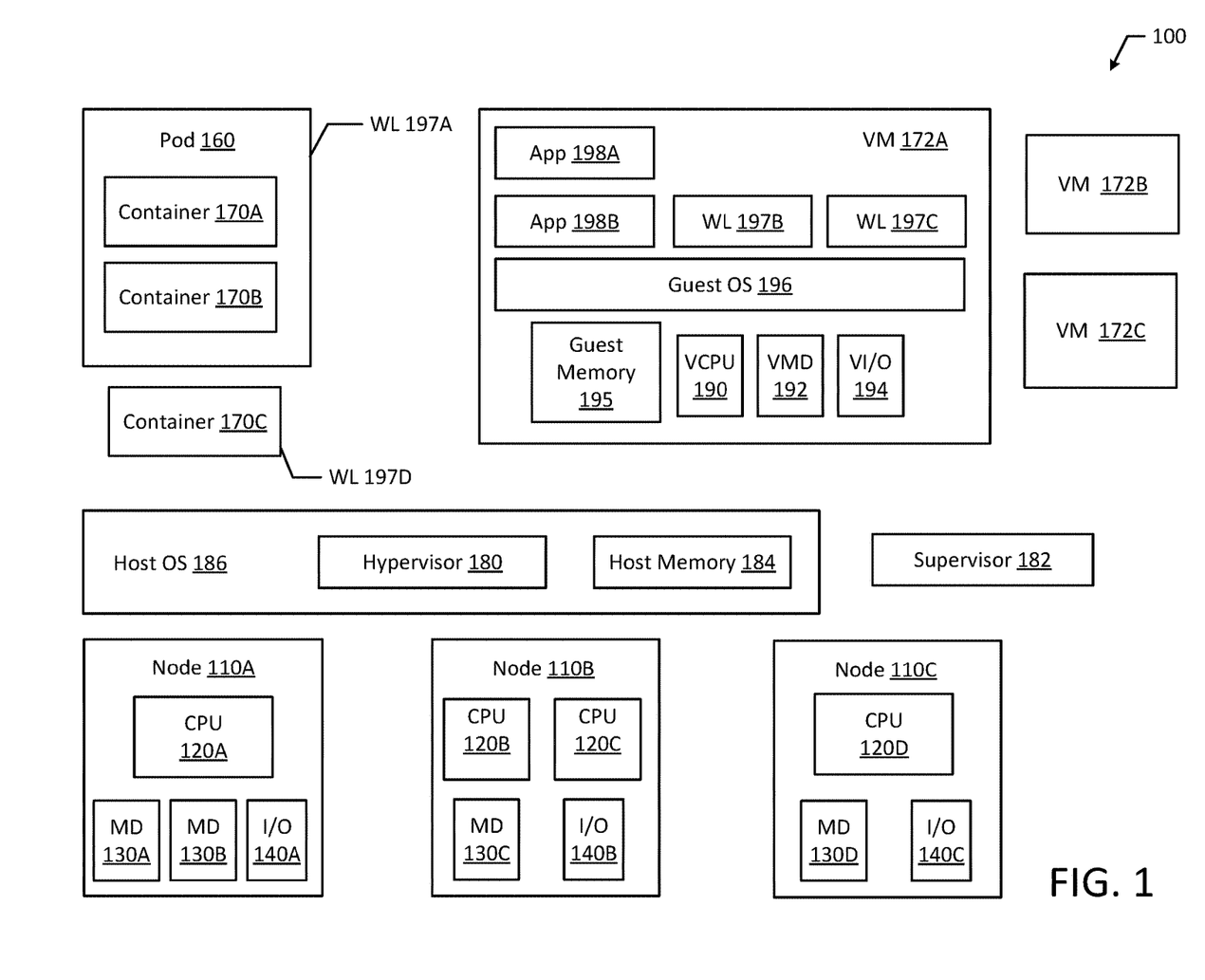
FIG. 1 illustrates a block diagram of an example computer system, according to an example embodiment.

FIG. 1 depicts a high-level component diagram of an example computing system 100 in accordance with one or more aspects of the present disclosure. The computing system 100 may include an operating system (e.g., host OS 186), one or more trusted execution environments (TEEs) (e.g., virtual machines (VMs) 172A-C, collectively referred to herein as VMs 172), one or more workloads (WLs) 197A-D (collectively referred to herein as WLs 197), and nodes (e.g., nodes 110A-C). The system 100 may include a hypervisor 180, a supervisor 182 (e.g., kernel), or a combination of both.

As used herein, a workload 197 may be an application (e.g., WL 197B-C may be applications similar to applications 198A-B), a container (e.g., WL 197D may be a container 170C), or a pod 160 of containers (e.g., pod 160 with containers 170A-B). The workloads 197A-D (e.g., programs, applications, services, microservices, containers, or pods) may be added to the computing system 100 to provide additional application functionality or to scale certain services or aspects of an application. For example, as processes are scaled to meet increased demand from clients, workloads 197A-D (e.g., containers or pods) may be replicated and deployed on various nodes and/or node clusters to handle the increased load. In an example, a workload 197 may be an execution environment, such as a server or virtual server, and/or a stand-alone execution environment, similar to that of a virtual machine.

The computer system 100 may include one or more nodes 110A-C. The nodes 110A-C may be cluster nodes with one or more machines running in a cluster. Each node 110A-C may in turn include one or more physical processors (e.g., CPU 120A-E) communicatively coupled to memory devices (e.g., MD 130A-E) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Workloads 197 may be provisioned on the same host or node (e.g., node 110A) or different nodes. For example, WL 197A and WL 197B may both be provisioned on node 110A. Alternatively, WL 197A may be provisioned on node 110A while WL 197B is provisioned on node 110B. In some examples, one or more of nodes 110A-C may be non-uniform memory access ("NUMA") nodes.

Containers 170A-C may execute applications, services, or microservices. As discussed above, a container 170 may be a workload 197 (e.g., container 170C is a WL 197D). In an example, the containers 170A-C may each run a process or service. In an example, one or more of the containers 170A-C may be an execution environment. For example, one or more of the containers 170A-C may be a server, such as a virtual server. It should be appreciated that the containers 170A-C may be stand-alone execution environments, similar to that of a virtual machine.

Virtual machines (VM) 172 may each include a guest OS(s), guest memory or virtual machine memory, a virtual CPU (VCPU), virtual memory devices (VMD), and virtual input/output devices (VI/O). For example, virtual machine 172A may include guest OS 196, guest memory or virtual machine memory 195, a virtual CPU(s) 190, a virtual memory device(s) 192, and a virtual input/output device(s) 194. Virtual machine memory or guest memory 195 may include one or more memory pages. In an example, VM 172 may execute the guest OS 196 and run applications 198A-B or WLs 197B-C, which may utilize the underlying VCPU 190, VMD 192, and VI/O device 194. In an example, a device may be implemented as a virtual machine (e.g., virtual machine 172A).

In an example, the computing system 100 may include a hypervisor 180 and host memory 184. Hypervisor 180 may manage host memory 184 for the host operating system 196 as well as memory allocated to the virtual machine 172 and/or guest operating system 196, such as guest memory or virtual machine memory 195 provided to guest OS 196. In an example, host memory 184 and virtual machine memory 195 may be divided into a plurality of memory pages that are managed by the hypervisor 180. Virtual machine memory 195 allocated to the guest OS 196 may be mapped from host memory 184 such that when a guest application 198A-B and/or a WL 197B-C uses or accesses a memory page of virtual machine memory 195, the guest application 198A-B and/or the WL 197B-C is actually using or accessing host memory 184.

In an example, the computing system 100 may include a supervisor 182 that coordinates and controls the operation of applications 198A-B and/or workloads 197A-D. In an example, the supervisor 182 may be a kernel or may be part of a kernel. In an example, the supervisor 182 may be the hypervisor 180.

The supervisor 182 or the hypervisor 180 or the OS 186 or the OS196 may be configured to allocate a respective memory space for each WL 197A-D running on the computer system 100. For example, the supervisor 182 or the hypervisor 180 may allocate one or more memory pages of the host memory 184 to WL 197B and one or more different memory pages of the host memory 184 to the WL 197C.

Additionally, the hypervisor 180 or the supervisor 182 may be configured to store and track usage of dirty memory for each WL 197 running on the computing system 100. For example, if a WL 197 needs to write data to a persistent memory (e.g., a disk, data storage, hard disk drive (HDD), solid state drive (SDD), server storage or other type of storage device (e.g., VMD 192), an I/O 140 that includes a storage device such as a flash drive or disk drive, etc.). Further, the hypervisor 180 or the supervisor 182 may temporarily store the data to a non-persistent memory (e.g., RAM), and may update page table entries to indicate that they are dirty memory pages. The supervisor 182 or the hypervisor 180 may also write-protect the dirty memory pages at least until they are transferred (e.g., written back, written out, etc.) to the persistent memory. Additionally, the hypervisor 180 or the supervisor 182 or the guest OS 196 may be configured to periodically trigger these write back operations (e.g., every second or other periodic interval).

In another example, different persistence settings may be assigned by the supervisor 182 or the hypervisor 180 to various VMs of the VMs 172. For example, the supervisor 182 or the hypervisor 180 may assign a default type (e.g., persistent, etc.) to VMs that do not have metadata indicating a user instruction to destroy or remove the VM in the event of a crash. Additionally or alternatively, the supervisor 182 or the hypervisor 180 may assign a first persistence setting (e.g., non-persistent) to VM 170A based on a configuration parameter of the VM 170A (or a workload running therein) indicating that the container 170A is an initialization or build container (e.g., a container that runs a setup script, or a container that must terminate before running container 170B, etc.); and the supervisor 182 or the hypervisor 180 may responsively assign a second persistence setting (e.g., persistent) to the VM 170A while the container 170B is running because container 170B may be a runtime container (e.g., a container that interacts with a user, a container configured to continue running until a termination request is received from a user, etc.) and thus the VM 170A is more sensitive to data loss risks while container 170B is running.

More generally, in some examples, the hypervisor 180 or the supervisor 182 may allow VMs that do not require guaranteed persistence in the event of a crash to skip periodically-triggered dirty memory clean up events, and optionally continuing to perform such periodically-triggered clean up events only for dirty memory of other VMs that are more sensitive to data persistence in the event of a crash.

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

Figure 2:
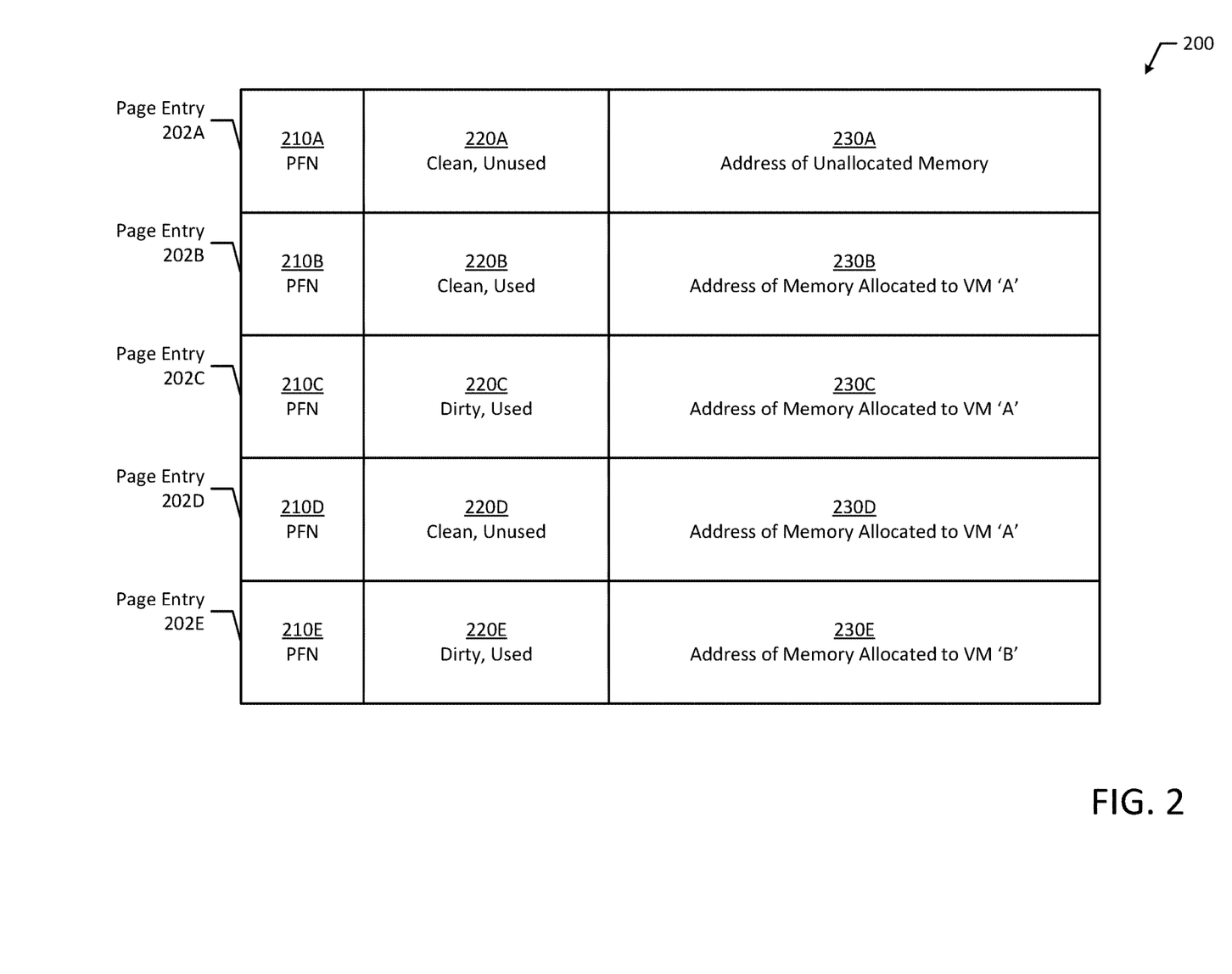
FIG. 2 illustrates a block diagram of an example page table, according to an example embodiment.

FIG. 2 illustrates a block diagram of a page table 200 according to an example embodiment of the present disclosure. The page table 200 may be a host page table. In general, the OS 186 or the hypervisor 180 or the supervisor 182 may manage memory usage of the VMs 172A-C and/or workloads executed therein. The physical memory allocated by the OS 186 or the hypervisor 180 or the supervisor 182 to each of the VMs 172A-C may be divided into memory pages, which are identified with a unique number (e.g., Page Frame Number (PFN) 210A-E).

Page table 200 is a data structure that may be used to store a mapping of memory addresses of the host memory 184 to memory addresses of physical memory allocated to each WL 197, virtual machine (e.g., VM 172), and/or application (e.g., applications 198A-B) running on the computer system 100. Accordingly, address translation may be handled using the page table(s) 200. In an example, the page table(s) 200 stores a mapping of virtual address to physical addresses.

The page table(s) 200 comprises page entries 202A-E that map PFN 210A-E (e.g., addresses of virtual memory such as VM 195 or other virtual memory in a guest space of a virtual machine) with physical memory addresses 230A-E. Page table(s) 200 may be used together with any paging data structure to support translation between addresses (e.g., 32-bit linear address space using a two-level hierarchical paging structure, Physical Address Extension mode, INTEL Extended Memory 64 Technology mode, etc.).

In an example, page table(s) 200 may include protection or status identifiers 220A-E. A status identifier 220A-E may indicate a status of a page corresponding to a page entry 202A-E of the page table(s) 200. For example, a status identifier 220A-E may be used to define that a given page is dirty (e.g., stores data that has not yet been written out to disk), clean, used (e.g., accessed), unused, etc.

In the illustrated example of FIG. 2, a memory page corresponding to page entry 202A having PFN 210A is an unallocated memory page (e.g., a memory page that is available for allocation to a new or existing workload). As such, the status identifier 220A of that page indicates that it is clean (e.g., does not store dirty memory written by any workload) and unused (e.g., not yet accessed by a user space or workload).

Further, in the illustrated example of FIG. 2, memory pages of page entries 202B-D are allocated to a first virtual machine (labeled as VM 'A' in FIG. 2). For example, the supervisor 182 or the hypervisor 180 may allocate these memory pages (having virtual addresses of PFN 210B-D corresponding to physical addresses 230B-230D) to the first VM 'A'. In this example, the supervisor 182 or the hypervisor 180 may temporary store dirty memory written by VM 'A' in one or more of the memory pages allocated to VM 'A' (e.g., the memory page of PFN 210C) and may mark the dirty memory pages of the VM 'A' as dirty memory pages using the corresponding status identifier (e.g., identifier 220C). In an example, the supervisor 182 or the hypervisor 180 may keep the "Dirty" identifier 220C to ensure that the memory page of PFN 210C is not over-written at least until the dirty memory stored in the memory address 230C is transferred to the persistent storage (e.g., disk). The supervisor 182 or the hypervisor 180 may then update status identifiers of memory pages that have been flushed out to disk as "Clean" instead of "Dirty," even if these memory pages are still being used to hold that same data. For instance, as shown, the memory page of PFN 210B is allocated to and used by VM 'A' but marked as clean. In this instance, the supervisor 182 or the hypervisor 180 may allow replacing (e.g., re-using) the clean memory page at PFN 210B even though it was used or accessed or may continue to keep the data in the memory address 230B until that space is needed.

The page table(s) 200 may include additional or different components than shown in FIG. 2, such as additional page entries, statistics information, background information, write-protection information, etc.

Figure 3:
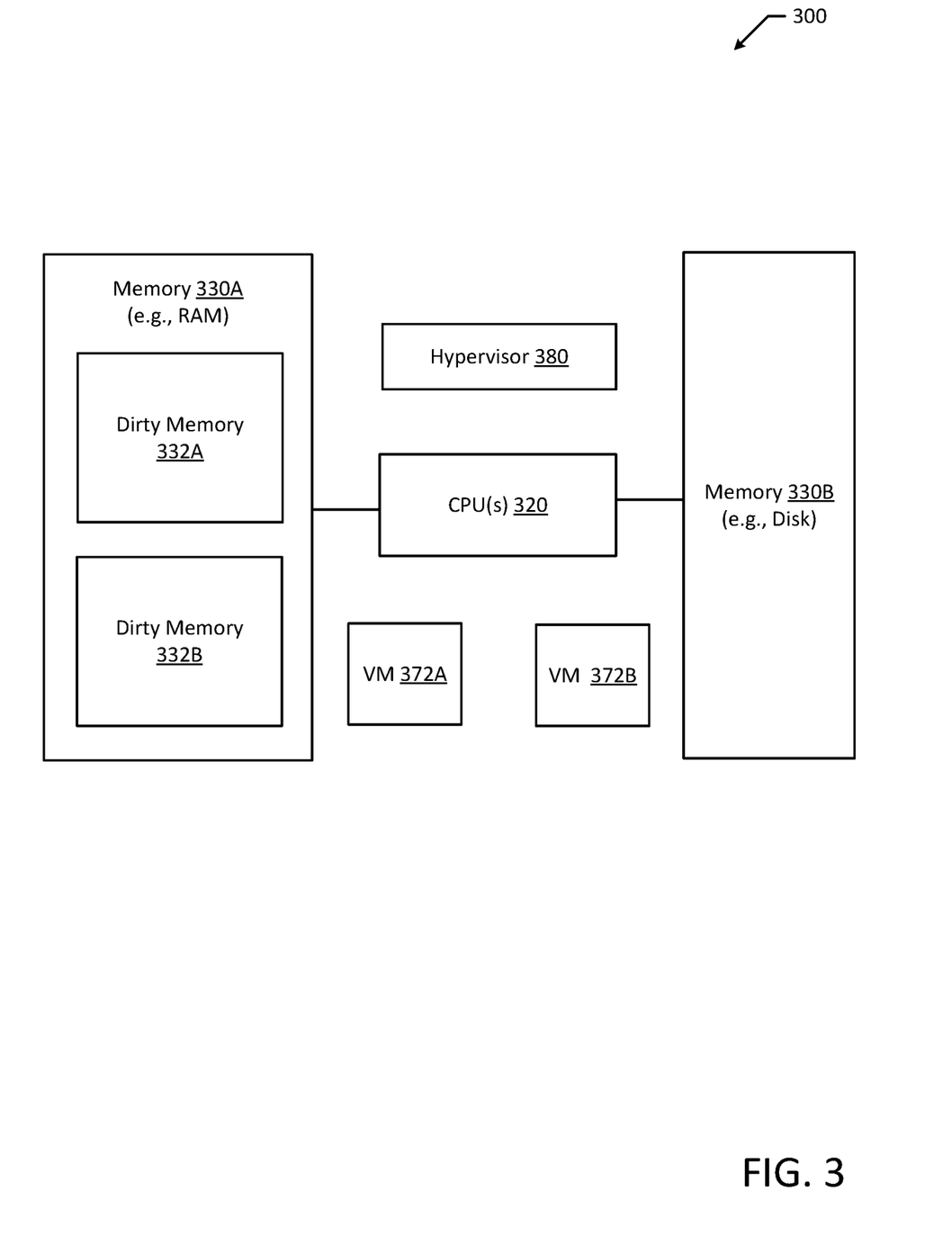
FIG. 3 illustrates a block diagram of an example computer system that includes different types of memory, according to an example embodiment.

FIG. 3 is a block diagram of an example system 300 that includes different types of memory 330A-B, according to an example embodiment. The system 300 may be a computing system similar to system 100 of FIG. 1. For example, the system 300 may include one or more CPUs 320, a hypervisor 380, and one or more VMs 372A-B, which are similar, respectively, to the CPUs 120, the supervisor 182, and the VMs 172.

The VMs 372A-B may be deployed to run on the system 300 and may be executing on the one or more CPUs 320. Further, the hypervisor 380 may be configured to store dirty memory written by the VM 372A in a first memory space 332A in the memory 330 and dirty memory written by VM 372B in a second memory space 332B, in line with the discussion above.

As noted above, the system 300 may include two different types of memories 330A-B. In an example, the memory 330A may be a non-persistent memory (e.g., RAM, disk cache, etc.) or any other type of memory device to which access by the CPU 320 is relatively faster than the memory 330B. In an example, the memory 330B may be a persistent memory (e.g., disk, data storage, server storage, flash drive, HDD, SDD, etc.) or any other type of memory device to which access by the CPU 320 is relatively slower (e.g., requires disk I/O operations, etc.) as compared to memory 330A.

As such, the hypervisor 380 may be configured to delay write back (or write out) of first data written by the VM 372A into the memory 330B, by temporarily storing the first data as first dirty memory 332A in the non-persistent memory 330A. Additionally, the hypervisor 380 may be configured to delay writing second data from the VM 372B to the persistent memory 330B by temporarily storing the second data as second dirty memory 332B in the non-persistent memory 330A Furthermore, the hypervisor 380 may select and/or assign a persistence setting for each of the VM 372A-B and/or for the portion of memory 330B (e.g., data storage) accessible to the respective VMs 372A-B.

For example, the VM 372A may deemed to be a persistent type of VM (e.g., expected to restart and continue running in the event of a crash, etc.) and the VM 372B may be deemed a less persistent or transient type of VM (e.g., used for running a build pod or having an auto-remove upon termination configuration, etc.). In this example, the hypervisor 380 may be configured to assign a first persistence setting to the VM 372A, which allows the hypervisor 380 and/or a guest OS of the VM 372A to perform periodically-triggered write back operations of the dirty memory 332A into the persistent memory 330B. On the other hand, in this example, the hypervisor 380 may be configured to disable periodically-triggered write out of the second dirty memory 332B of the VM 372B into the memory 330B by assigning a second different persistence setting (e.g., that does not guarantee persistence in the event of a crash) to the VM 372B.

Figure 4:
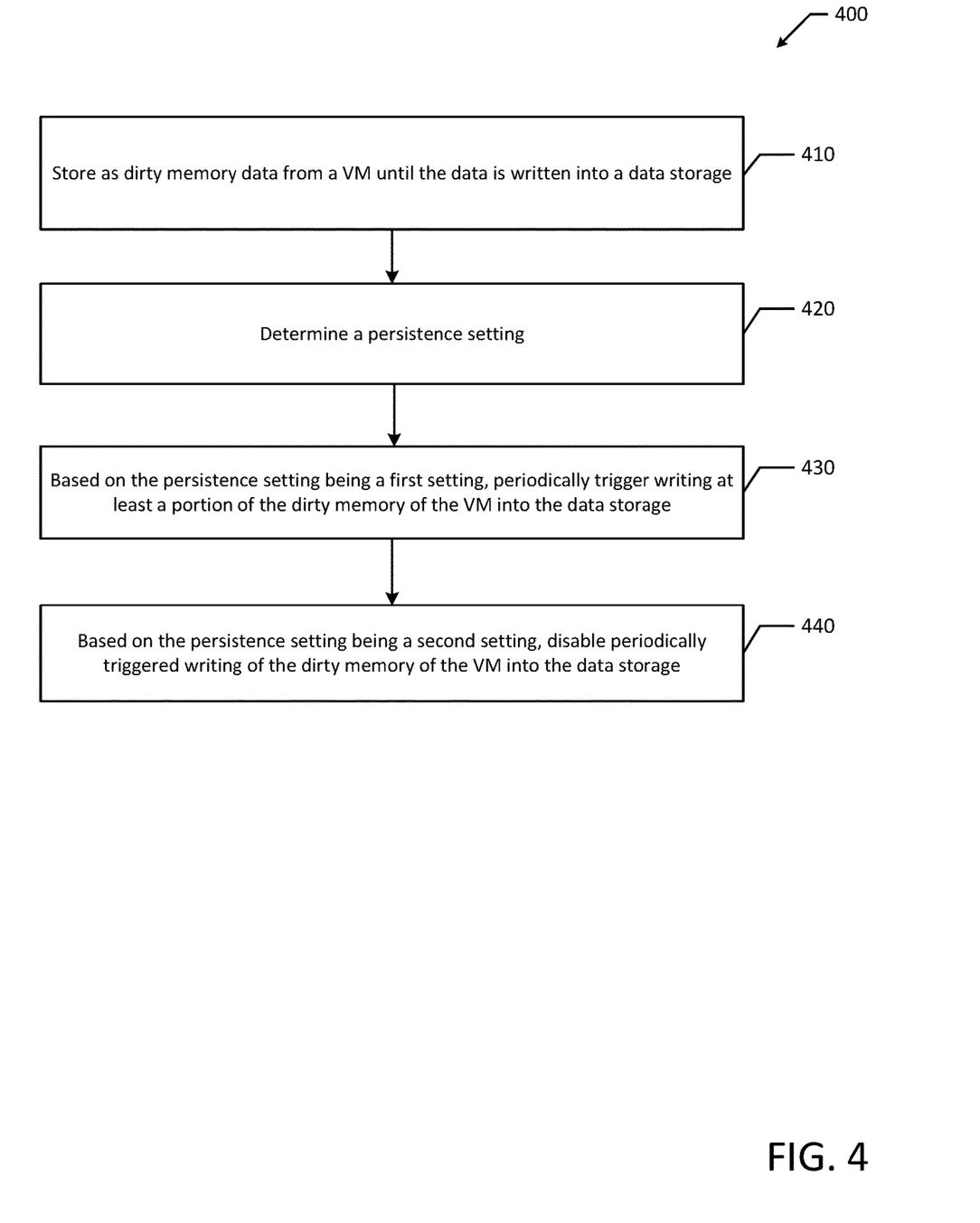
FIG. 4 illustrates a flowchart of an example process for monitoring and managing dirty memory usage, according to an example embodiment.

FIG. 4 is a flowchart of an example method 400 for memory management, in accordance with an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

At block 410, method 400 includes storing data from a virtual machine (VM) as dirty memory at least until the data is written into a data storage. Referring back to FIG. 3 for example, the hypervisor 380 may temporarily store dirty memory 332A written by the VM 372A in the non-persistent memory 330A at least until the hypervisor 380 writes the dirty memory 332A out to the persistent memory 330B.

At block 420, method 400 involves determining a persistence setting for managing the dirty memory of the VM. In some examples, determining the persistence setting may be a default setting (e.g., a first setting that causes the hypervisor to periodically trigger write back operations). In some examples, determining the persistence setting may be based on user-specified input or other configuration parameter such as a shutdown policy or a restart policy of the VM. For example, an administrator of the VM 372A may instruct the hypervisor 380 to "destroy on crash" or remove (without saving) the guest domain of VM 372 immediately after it stops running (normally or due to a crash). In this case, the hypervisor 380 may determine that the VM 372A may not need the reduced risk of data loss associated with periodic triggering of dirty memory flushes, and thus may assign a second persistence setting for the VM 372A to disable the periodic triggering of dirty memory write operations (at least with respect to the dirty memory of the VM 372A).

At block 430, method 400 involves periodically triggering writing at least a portion of the dirty memory of the VM into the data storage based on the persistence setting being a first setting. For example, if the data from the VM is to be written into a virtual storage device (e.g., corresponding to an allocated capacity in the permanent memory 330B) identified by the hypervisor 380 as having the first setting, then the hypervisor 380 may perform periodically triggered write operations to write the dirty memory 332A of the VM 372A into the data storage (e.g., memory 330B).

In some examples, the memory is a RAM and the data storage is a disk (e.g., memory 330B). In these examples, the triggering at block 430 may involve moving at least a portion of the dirty memory from the RAM to the disk. Referring back to FIG. 3 for example, the hypervisor 380 may move the dirty memory 332A of the VM 372A from the RAM 330A to the disk 330B.

At block 440, method 400 involves disabling periodically triggered writing of the dirty memory of the VM into the data storage based on the persistence setting being a second setting. For example, the second setting may be a setting that does not guarantee persistence of the data storage of the VM in the event of a crash. Thus, the hypervisor (e.g., 380) may assign the second setting to the VM 372B if the VM 372B is deemed to be a VM that does not necessarily need to guarantee its persistence in the event of a crash (e.g., a VM having an auto-remove upon termination configuration, a build or compile VM, etc.). In turn, the hypervisor 380 may be configured to skip and/or disable the periodic triggering of dirty memory write back operations (at least with respect to the dirty memory 332B of the VM 372B).

In some examples, the method 400 may also involve sending a notification message to a guest OS of the VM 372B about the selected persistence setting, so as to similarly prevent periodic triggering, by the guest OS, the writing out of the dirty memory 332B of the VM 372B into the data storage (e.g., 330B).

Figure 5:
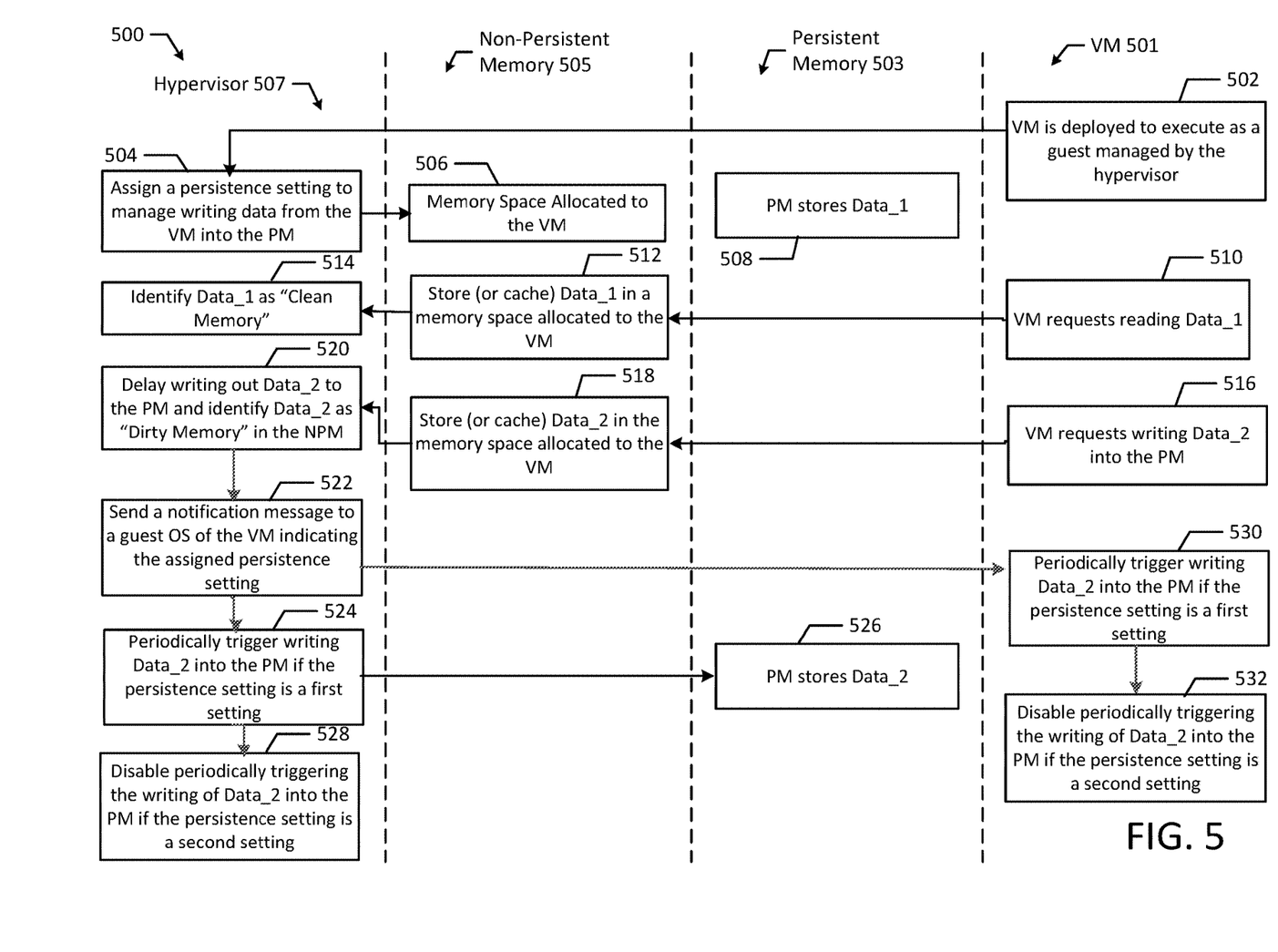
FIG. 5 illustrates a flow diagram of an example process for efficient virtual machine disk cache management, according to an example embodiment.

FIG. 5 depicts a flow diagram illustrating an example method 500 for managing dirty memory usage, according to an example embodiment. Although the example method 500 is described with reference to the flow diagram illustrated in FIG. 5, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuity, dedicated logic, etc.), software, or a combination of both. The system 500 may include a virtual machine (VM) 501, a persistent memory (PM) 503, a non-persistent memory (NPM) 505, and a hypervisor 507.

At block 502, the VM 501 is deployed for execution on the hypervisor 507 according to specific configuration parameters as a guest virtual machine. For example, an administrator of the host machine or hypervisor 507 may provide the specific configuration parameters (e.g., requested resources for allocation, requested initialization and/or shut down operations, etc.) as metadata or as command line parameters instructing the hypervisor 507 to create the VM 501 accordingly. The hypervisor 507 may then use these configuration parameters to deploy the VM 501 on a suitable node that has sufficient resources, etc., for allocation to the VM 501 according to the specific configuration parameters. For example, the hypervisor 507 may allocate a memory space (at block 506) in the non-persistent memory (NPM) 505 to the for the VM 501 as well as data storage capacity in the persistent memory (PM) 503.

At block 504, the hypervisor 507 may assign a persistence setting to allocated data storage capacity of the VM 501 in PM 503. For example, the hypervisor 507 may virtualize the allocated data capacity as a storage device that does not guarantee persistence or, alternatively, as a storage device that more diligently attempts to reduce the disk of data loss in the event of a crash of the VM.

At block 508, the PM 503 (e.g., disk 330B, data storage, etc.) of the system 500 stores "Data_1." For example, Data_1 may be data such as files stored in a disk drive 503 or other persistent type of data storage 503, which may optionally be accessible to the host system of the hypervisor 507 via an I/O interface.

At block 510, the VM 501 (while executing on the processor) requests reading Data_1 from the PM 503. In response, the system 500 may obtain Data_1 (from the PM 503) and then store or cache a copy of Data_1 into NPM 505 (at block 512).

At block 514, the hypervisor 507 identifies Data_1 as clean memory in the memory space allocated to the VM 501. For example, the hypervisor 507 may update a status identifier (e.g., 220B) of a memory page entry (e.g., 202B) in the NPM 505 where Data_1 is stored to identify it as clean memory.

At block 516, the VM 501 requests writing Data_2 into the PM 503. In an example, Data_2 may be an updated version of Data_1 or may be unrelated to Data_1. In response, at block 518, the hypervisor 507 may temporarily store or cache Data_2 in the memory space allocated to VM 501. Additionally, at block 520, the hypervisor 507 may delay writing out Data_2 to the PM and may identify Data_2 as dirty memory in the NPM. For example, the hypervisor 507 may update a memory page table (e.g., 200) to update a status identifier (e.g., 220C) of a memory page entry (e.g., 202C) of a memory address (e.g., 230C) in the NPM 505 where Data_2 is stored to identify that memory address as dirty memory.

At block 524, the hypervisor 507 periodically triggers writing Data_2 into the PM if the persistence setting is a first setting. In other words, for VMs (e.g., production, data processing, etc.) that may need to resume their operation by restarting in the event of a crash or other interruption, the hypervisor 507 may assign the first setting to ensure that Data_2 is quickly synchronized from the NPM 505 to the PM 503 (at block 526) and thus reduce the risk of data loss in the event of a crash.

On the other hand, at block 528, if the hypervisor 507 instead determines that the VM 501 is unlikely to benefit significantly from a lower risk of data loss in the event of a crash, then the hypervisor 507 may instead assign the second setting as the persistence setting. For example, if the administrator of the VM 501 chooses the second setting or if a configuration parameter (e.g., shut down policy, restart policy, etc.) of the VM 501 indicates that the VM 501 and all its data should be removed when the VM 501 terminates (i.e., the VM 501 is expected to re-initialize all its data when it starts, etc.), such as when the VM 501 is configured to automatically be removed upon termination, then the second setting indicates to the hypervisor 501 that it may skip periodic dirty memory write back operations (at block 528) as guaranteeing persistence may not be critical for the operation of this specific type of VM 501. As a result, with the second setting, overhead associated with programing timers to frequently perform the computationally expensive write back operations periodically may be cancelled or stopped to improve the latency of the system 100.

Since the VM 501 may also have its own OS and kernel that may similarly perform dirty memory management functions, the hypervisor 507 may also send a notification message to a guest OS of the VM 501 (at block 522) about the assigned persistence setting for data write operations into the PM 503 from the VM 501. If the persistence setting is the first setting, at block 530, the guest OS of the VM 501 may perform periodic triggering write back operations similarly to the hypervisor 507 at block 544. Otherwise, if the persistence setting is the second setting, the guest OS of the VM 501 (at block 532) may instead disable the periodical triggering (by the guest OS of the VM) of the writing out of Data_2 into the PM 503.

Figure 6:
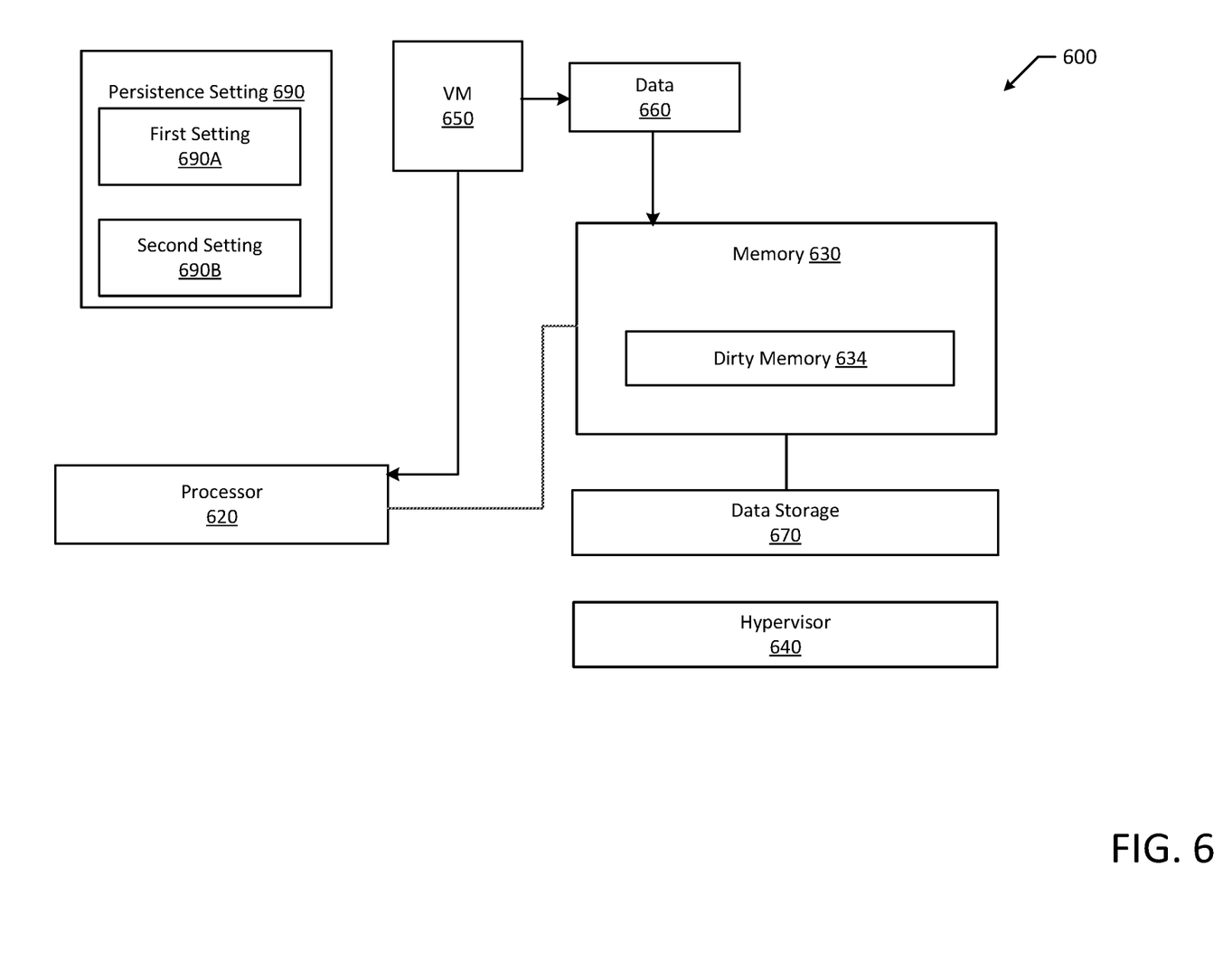
FIG. 6 illustrates a block diagram of an example memory management system, according to an example embodiment of the present disclosure.

FIG. 6 is a block diagram of an example system 600, according to an example embodiment of the present disclosure. The system 600 includes a memory 630, a processor 620 in communication with the memory 630, and a hypervisor 640. The hypervisor 640 temporarily stores data 660 written by a VM 650 executing on the processor 620 as dirty memory 634, at least until the data 660 is written out into a data storage 670. The hypervisor 640 also assigns a persistence setting 690 to the VM 650 and/or the data storage 670. If the assigned persistence setting 690 is the first setting 690A, then the hypervisor 640 periodically triggers writing out the dirty memory 634 into the data storage 670. If the assigned persistence setting 690 is the second setting 690B, then the hypervisor 640 prevents periodic triggering of the writing out of the dirty memory 634 into the data storage 670.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system comprising:
a memory;
a processor in communication with the memory; and
a hypervisor, wherein the hypervisor is configured to:
store, in the memory, data written by a virtual machine (VM) as dirty memory at least until the data is written back into a data storage;
assign a persistence setting for the VM or the data storage;
based on the persistence setting being a first setting, periodically trigger write back of at least a portion of the dirty memory into the data storage; and
based on the persistence setting being a second setting, exclude the dirty memory of the VM from periodically triggered write back operations of the hypervisor.

2. The system of claim 1, wherein the hypervisor is configured to send a notification to a guest operating system (OS) of the virtual machine indicating assignment of the second setting as the persistence setting,
wherein the guest OS is configured to, in response to receipt of the notification from the hypervisor, disable periodic triggering, by the guest OS, of the write back of the dirty memory into the data storage.

3. The system of claim 1, wherein the hypervisor is configured to:
select the persistence setting based on a configuration parameter of the VM, wherein the configuration parameter is indicative of one or more operations to be performed by the hypervisor upon termination of execution of the VM on the hypervisor.

4. The system of claim 3, wherein the hypervisor is configured to:
in response to the configuration parameter indicating that the hypervisor is to remove VM from the system upon the termination, select the second setting as the persistence setting.

5. The system of claim 3, wherein the configuration parameter is based on user input received prior to creation of the virtual machine.

6. The system of claim 1, wherein the hypervisor is configured to:
allocate, as a virtual storage device, the data storage to the VM; and
assign the second setting as the persistence setting of the virtual storage device, wherein excluding the dirty memory of the VM from the periodically triggered write back operations of the hypervisor is further based on the VM requesting that the data be written to the virtual storage device.

7. The system of claim 1, wherein the hypervisor is configured to:
identify a workload that is running in the VM to generate the data in the dirty memory; and
select the persistence setting based on a type of the workload.

8. The system of claim 1, wherein the data storage is a disk.

9. The system of claim 1, wherein the memory is a random access memory (RAM).

10. A method comprising:
storing, as dirty memory, data from a virtual machine (VM) executing on a hypervisor at least until the data is written out to a data storage;
selecting a persistence setting for managing write out of the dirty memory of the VM into the data storage;
based on the persistence setting being a first setting, periodically triggering write out of at least a portion of the dirty memory to the data storage; and
based on the persistence setting being a second setting, disabling periodic triggering, by the hypervisor, of the write out of the dirty memory into the data storage.

11. The method of claim 10, further comprising:
sending, by the hypervisor to a guest operating system (OS) of the VM, a notification indicating assignment of the second setting as the persistence setting,
wherein the guest OS is configured to, in response to receipt of the notification from the hypervisor, disable periodic triggering, by the guest OS, of the write back of the dirty memory into the data storage.

12. The method of claim 10, further comprising:
selecting the persistence setting based on a configuration parameter of the VM, wherein the configuration parameter is indicative of one or more operations to be performed by the hypervisor upon termination of execution of the VM on the hypervisor.

13. The method of claim 12, further comprising:
in response to the configuration parameter indicating that the hypervisor is to remove the VM from a system upon the termination, select the second setting as the persistence setting.

14. The method of claim 10, further comprising:
allocating, as a virtual storage device, the data storage to the VM; and
assigning the second setting as the persistence setting of the virtual storage device,
wherein disabling the periodic triggering of the write back of the dirty memory is further based on the VM indicating that the data is to be written into the virtual storage device.

15. The method of claim 10, wherein the data storage is a disk.

16. The method of claim 10, wherein the data is stored as the dirty memory in a random access memory (RAM).

17. A non-transitory machine-readable medium storing instructions that, when executed by at least one processor of a computer system, cause the computer system to:
store, as dirty memory, data from a virtual machine (VM) at least until the data is written to a data storage;
select a persistence setting for managing the dirty memory of the VM;
based on the persistence setting being a first setting, periodically trigger writing at least a portion of the dirty memory to the data storage; and
based on the persistence setting being a second setting, prevent periodic triggering, by a hypervisor, of the writing of the dirty memory into the data storage.

18. The non-transitory machine-readable medium of claim 17, wherein the instructions, when executed by the at least one processor, further cause the computer system to:
   send a notification from the hypervisor to a guest operating system (OS) of the VM, the notification indicating selection of the second setting as the persistence setting,
   wherein the guest OS is configured to, in response to receipt of the notification from the hypervisor, disable periodic triggering, by the guest OS, of the write back of the dirty memory into the data storage.

19. The non-transitory machine-readable medium of claim 17, wherein the instructions, when executed by the at least one processor, further cause the computer system to:
   select the persistence setting based on a configuration parameter of the VM, wherein the configuration parameter is indicative of one or more operations to be performed by the hypervisor upon termination of execution of the VM on the hypervisor.

20. The non-transitory machine-readable medium of claim 19, wherein the instructions, when executed by the at least one processor, further cause the computer system to:
   in response to the configuration parameter indicating that the hypervisor is to remove the VM from the computer system upon the termination of execution of the VM, select the second setting as the persistence setting.

* * * * *